Sept. 7, 1937.         L. E. BROWN         2,092,637
TOOL JOINT FACING MACHINE
Filed Feb. 18, 1936          2 Sheets-Sheet 2

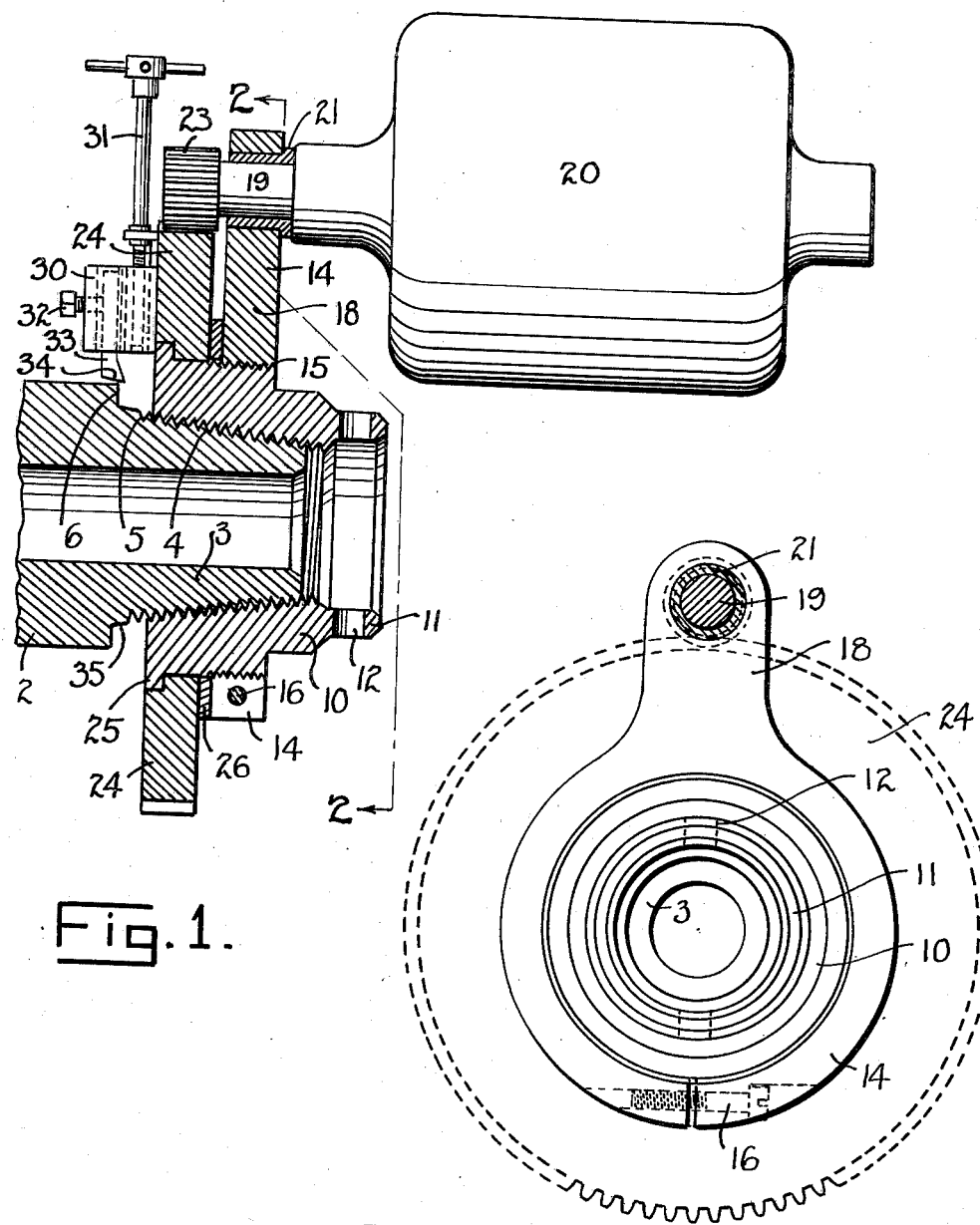

Inventor
L. E. BROWN
Jesse R. Stone
Lester B. Clark
By
Attorneys.

Patented Sept. 7, 1937

2,092,637

UNITED STATES PATENT OFFICE 2,092,637

TOOL JOINT FACING MACHINE

Luther E. Brown, Greggton, Tex.

Application February 18, 1936, Serial No. 64,455

5 Claims. (Cl. 82—4)

The invention relates to a machine for refacing the shoulders on pipe connections and particularly the shoulders which form a seal on a pipe joint having a tapered thread where the shoulders form a seal to prevent leakage from the pipe.

In the drilling of oil wells by the rotary method sections of pipe are coupled end to end in order to advance the drill bit into the earth being drilled and this stem is used as the means of rotating the bit and also of applying the flow of mud or water in order to cool the bit and to wash the cuttings away. An enormous torque is applied to the drill bit and this is particularly true when deep wells are drilled where from 5,000 to 10,000 feet of pipe may be connected together and each joint must withstand the enormous torque applied to the pipe. At the same time a fluid pressure is applied to the inside of the pipe which may approximate 1500 or 2000 pounds per square inch. Needless to say the pipe joint connections are therefore subjected to very severe strains, and they become worn and mutilated not only during use but in handling as well.

There are various forms of pipe connections, the most popular being what is known as a tool joint connection wherein a pin member is permanently screwed to one end of the drill pipe and is provided with a coarse thread which is arranged to be received in a tool joint box member which is connected to the adjoining end of the next section of pipe.

In this manner a coarse thread is available for screwing and unscrewing when the pipes are to be disconnected rather than a fine thread such as that by which the tool joint member is connected to the drill joint member is connected to the drill stem. There is also what is known as flush joint drill pipe where the coarse threads are formed directly on the ends of the pipe and no tool joint members are employed. In either instance, however, a square shoulder is provided on both the pin and box member which shoulders must move into a tight sealing engagement in order to transfer the torque from one pipe to the next and to also form a seal. These shoulders become worn and mutilated during use and the present invention applies itself to a portable machine which can be used in the field to reface the shoulders so that the pipe need not be discarded.

As the present practice is understood when the shoulders on the drill stem become worn the pipe must be transported to a factory or machine shop where the shoulders can be refaced by placing the pipe in a lathe and operating on it in the usual manner of turning a square shoulder; but with the present machine this operation can be carried on in the field while some other phase of the drilling is being accomplished, so that the pipe may be repaired without interrupting the drilling of the well, and with a material saving.

It is one of the objects of the invention to provide a tool joint shoulder facing machine which can be applied to the tool joint.

Another object of the invention is to provide a pipe connection facing tool which can be set and adjusted with respect to the shoulder to be faced and the facing operation performed.

Another object of the invention is to provide a combination gauge and facing tool for threaded connections so that the shoulders of the connection may be refaced.

Other and further objects of the invention will be readily apparent when the following description is considered in connection with the drawings, wherein:

Fig. 1 is a view of the machine attached to the pin member of a pipe joint and showing the parts in section to illustrate the manner of their assembly.

Fig. 2 is a section taken on the line 2—2 of Fig. 1 and looking in the direction of the arrows to illustrate the arrangement of the supporting structure for the driving unit.

The invention will be described as being applied to a tapered threaded pipe connection, regardless of whether such connection is carried by a tool joint member or directly formed upon the drill pipe section.

Figure 4:
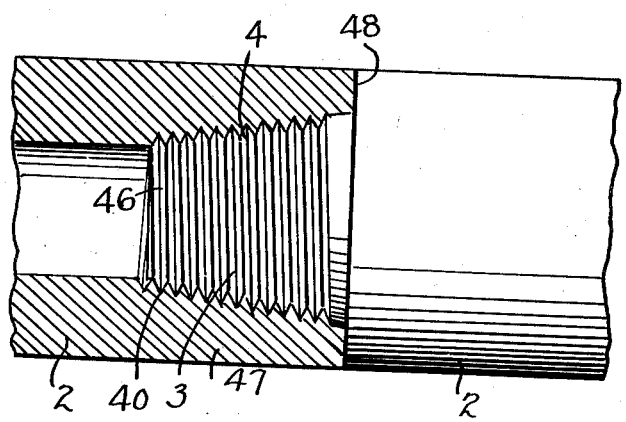
Fig. 4 is a side view of a pipe connection showing the box member in section and illustrating the contact of the refaced shoulders.

In Fig. 1 the end of the pipe which is to be faced is illustrated generally at 2. This pipe is formed with a pin member 3 which is provided with a coarse thread 4 thereon. This thread in the form illustrated is a tapered thread and terminates at 5 just short of a shoulder 6. This shoulder 6 must be accurately formed so that it will cooperate with a similar shoulder on the box member to form a complete seal when the pipe sections are screwed together as seen in Fig. 4. It will be understood that during use when the shoulders 6 become mutilated the pin and the box member tend to screw together an additional amount, because it is the shoulders which serve as a stop to prevent any further screwing together of the pin and the box member. In this manner the threads become enlarged somewhat and therefore when the shoulders are refaced the pipe connection may be made up more tightly and the threads tend to advance over each other an additional amount sufficient to permit contact of the refaced shoulders. In order that the machine may be accurately positioned on the pipe connection, therefore, a gauge 10 has been provided. This may be the usual type of gauge which is used to test the accuracy of the threads, or it may be a special chuck member made up for the purpose of supporting the present machine. In either event this chuck or gauge as seen in Fig. 1 is threaded internally to fit over the pin member 3 and engage the threads 4.

An extension 11 is provided on the chuck which has openings 12 therethrough to receive a bar or rod by which the chuck 10 may be firmly screwed on to the pin member. The chuck carries a support or flange member 14 which is shown as threaded at 15 on to the outside of the chuck or gauge 10. This support member 14 carries a screw or bolt 16 which can be moved to clamp the support firmly about a chuck so that it will be immovable. This support member has an extension or arm 18 thereon which serves to support the shaft 19 of a power unit 20. A suitable bushing or bearing 21 is provided in the arm 18 so that the shaft may rotate.

The end of the shaft 19 carries a drive pinion 23 whose teeth are arranged to mesh with a drive gear 24 which is rotatably mounted upon the chuck or gauge 10. The chuck has a flange 25 thereon and the inside of the gear is formed with an undercut portion to seat against this flange. A thrust ring 26 abuts against one side of the gear 24 so that the thrust of the gear is transmitted to the support member 14.

It seems obvious that as the power unit 20 is rotated it will cause the rotating of the drive or ring gear 24. A cutting or facing tool 30 is affixed to the one side of the ring gear 24 and is adjustable radially by means of the handle member 31 and adjustable toward and away from the ring gear by means of the set screw 32. The cutting member is seen at 33 and may have a beveled face 34 so that the cut made will be in alignment with the tapered portion 35 of the pipe connection and the new shoulder will therefore be in alignment with the other parts. Fig. 1 shows the device in position to begin cutting a new shoulder.

Figure 3:
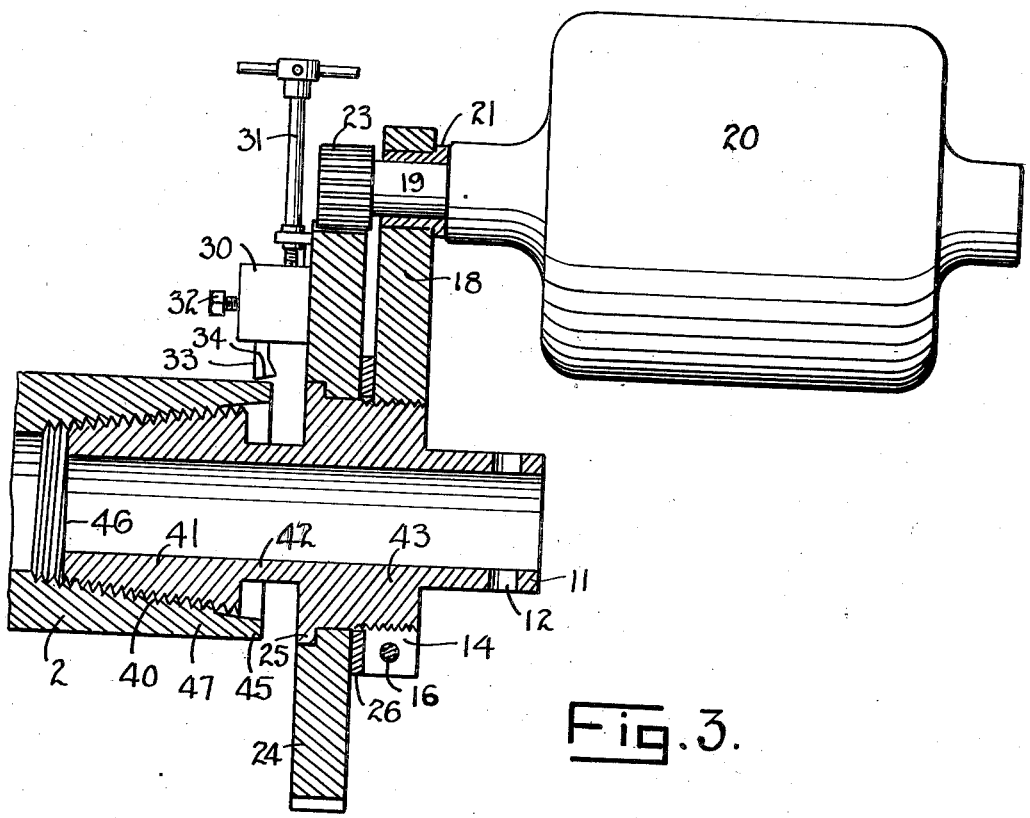
Fig. 3 is a view similar to Fig. 1, but showing the machine as attached to a box member where the shoulder is to be refaced.

Fig. 3 shows the same structure as previously described in connection with Fig. 1 except the chuck or support member 10 is of a different configuration in order to fit into the box member 40 of the pipe 2. In this arrangement the chuck is indicated at 41 and is externally threaded to screw into the threads 40 a predetermined amount so that the device will be properly positioned. The chuck carries a stem portion 42 and the head portion 43 which has the support member 14 fixed thereon, the same as in the Fig. 1 form of the invention.

The gear 24 is carried in the same manner with the same supporting parts and the cutting tool 34 is arranged to cut off the mutilated shoulder 45 so that the pin and box member may be screwed further together in order to seat the new shoulder. The remaining parts are the same as previously described.

Fig. 4 shows the pipes 2 threaded together after the new shoulders have been formed thereon and it will be noted that the end 46 of the pin member 3 extends downward into the threads 46 of the box member 47 further than does the chuck 41 in Fig. 3 which indicates that the shoulder 45 has been milled away and a new shoulder 48 formed on each the box member and the pin member and it is these shoulders which form the seal when the threads are made up more tightly.

Broadly the invention contemplates a machine which can be transported to any desired location and readily affixed to the pipe which is to be refaced, so that a quick and economical refacing operation may be carried on.

What is claimed is:

1. A machine for refacing the shoulders of taper threaded pipe joints comprising a gauge to be screwed onto said tapered thread to position the machine relative to the cut to be made, a support member on said gauge, means to adjust the position of said member on said gauge, a drive gear, means carried by said support member to rotate said gear relative to said gauge and member, an adjustable tool carried by said gear and arranged to move radially to cut the shoulder of the pipe whereby a new shoulder is formed which will form a seal with a similar new shoulder on the connecting pipe.

2. A portable drill stem shoulder refinishing machine comprising a gauge threaded to connect to the tapered threads of the stem so that said gauge will be set at a predetermined position relative to the shoulder to be refinished, a stem on said gauge extending beneath the tapered thread, a gear rotatable on said stem, means anchored on said stem to drive said gear, a facing tool carried by said gear to cut away the shoulder of the stem, and additional means to advance said cutting tool across the said threads.

3. A portable drill stem shoulder facing machine comprising a gauge threaded to connect to the tapered threads of a stem so that when said gauge is screwed tightly against the tapered threads it will be set at a predetermined distance from the shoulder to be faced, a tool carrier, means to move said carrier rotatably on the gauge, power means anchored on said gauge to drive said carrier, a facing tool radially movable on the carrier and arranged to cut away the shoulder of the stem.

4. A portable shoulder facing machine comprising a gauge threaded to connect to the tapered threads of the work so that said gauge will be set a predetermined distance from the shoulder to be faced, a tool carrier rotatable on the gauge, means to drive said carrier, a facing tool movable radially on the carrier and arranged to face the shoulder, and means for adjusting the facing tool both radially and longitudinally of said tool carrier.

5. A machine for refinishing the shoulder on a pipe which is adjacent the end of a tapered thread so that the abutting shoulders on the internal and external threads making up the pipe connection will form a seal comprising a tapered thread gauge member to be affixed to the tapered thread in a predetermined position relative to said threaded portion, a flange on said gauge, a gear rotatable on said gauge and against said flange, power means anchored on said gauge to rotate said gear, a cutter blade, means to adjustably position said cutter on said gear so that it may be moved radially inward transversely of the axis of the pipe so as to refinish said shoulder upon rotation of said gear.

LUTHER E. BROWN.